US008762161B2

(12) United States Patent
Ashkenazi et al.

(10) Patent No.: US 8,762,161 B2
(45) Date of Patent: Jun. 24, 2014

(54) METHOD AND APPARATUS FOR VISUALIZATION OF INTERACTION CATEGORIZATION

(75) Inventors: Tzach Ashkenazi, Petach-Tikva (IL); Oren Pereg, Amikam (IL); Yuval Lubowich, Ra'anana (IL)

(73) Assignee: Nice Systems Ltd., Ra'anana (IL)

( * ) Notice: Subject to any disclaimer, the term of this patent is extended or adjusted under 35 U.S.C. 154(b) by 1323 days.

(21) Appl. No.: 12/245,778

(22) Filed: Oct. 6, 2008

(65) Prior Publication Data

US 2010/0088323 A1    Apr. 8, 2010

(51) Int. Cl.
| | |
|---|---|
| *G06Q 30/02* | (2012.01) |
| *G06Q 10/10* | (2012.01) |
| *G06Q 10/06* | (2012.01) |
| *G06Q 30/06* | (2012.01) |
| *G06Q 10/08* | (2012.01) |
| *G06F 17/30* | (2006.01) |

(52) U.S. Cl.
CPC .......... *G06F 17/30994* (2013.01); *G06Q 10/06* (2013.01)
USPC ............................................ 705/1.1; 705/319

(58) Field of Classification Search
USPC ................................................. 705/1.1–912
See application file for complete search history.

(56) References Cited

U.S. PATENT DOCUMENTS

| | | | | |
|---|---|---|---|---|
| 6,820,081 | B1 * | 11/2004 | Kawai et al. ........................... 1/1 |
| 7,058,543 | B2 * | 6/2006 | Takahashi et al. ............ 702/183 |
| 2002/0196292 | A1 * | 12/2002 | Itoh et al. ....................... 345/853 |
| 2003/0149727 | A1 * | 8/2003 | Jaschek et al. ................ 709/206 |
| 2005/0105712 | A1 * | 5/2005 | Williams et al. .......... 379/265.02 |
| 2007/0214137 | A1 * | 9/2007 | Gloor ................................ 707/6 |
| 2009/0158429 | A1 * | 6/2009 | Alstyne et al. .................. 726/22 |

* cited by examiner

Primary Examiner — Jonathan Ouellette
(74) Attorney, Agent, or Firm — Soroker-Agmon

(57) ABSTRACT

A method and apparatus for visualization of call categorization, comprising steps and components for: defining or receiving a definition for one or more categories and criteria for each category; receiving or capturing interactions; categorizing the interactions into the categories; determining relations between the categories; determining layout for the categories and relations; and visualizing the layout. The method and apparatus can further comprise steps and components for extracting key-phrases, determining connections between key-phrases, connections between categories based on key-phrases, and connections between categories and key-phrases, and visualizing the categories, key-phrases and connections. The method and apparatus can further comprise steps and components for training models upon which the relations between categories and relations between key-phrases are determined.

30 Claims, 7 Drawing Sheets

METHOD AND APPARATUS FOR VISUALIZATION OF INTERACTION CATEGORIZATION

TECHNICAL FIELD

The present disclosure relates to interaction analysis in general, and to visualization of interaction categorization or key-phrases, in particular.

BACKGROUND

Within organizations or organizations' units that mainly handle interactions, such as call centers, customer relations centers, trade floors, law enforcements agencies, homeland security offices or the like, it is often valuable to classify interactions according to one or more anthologies. Interactions may take multiple forms, including phone calls using all types of phone, transmitted radio, recorded audio events, walk-in center events, video conferences, e-mails, chats, access through a web site or the like.

Categories may be defined which relate to various aspects of interactions, such as content of the interactions, customer satisfaction, subject, product, interaction type, up-sale opportunities, high-risk calls, legal threats, customer churn related, or others.

Interactions can then be assigned to various categories, wherein each interaction can be assigned to one or more categories, or to no category. The categorization provides structured information related to the interactions. For example, a category associated with an interaction may be important for answering questions such as what is the general content of the interaction, why are customers calling. General analysis of the categories can answer questions like what are the main contributions to call volume, how can the volume be reduced, and others. The categorization can also be used for taking business actions, such as locating missed opportunities, locating dissatisfied customers, determining how to allocate resources more accurately, such as allocating more agents to handle calls related to one or more subjects of business process optimization, cost reduction, improving quality/service/product, agent tutoring, customer churn preventing, and the like.

However these options provide only a fragment of the capabilities enabled by the categorization. There is thus a need for an apparatus and method for extracting valuable data from a categorization and the interactions assigned to the various categories, particularly in an interaction-rich environment.

SUMMARY

An apparatus and method for visualization of categories related to subjects of interactions within or with or with an entity external to a call center.

One aspect of the disclosure relates to a method for visualization of an interaction categorization, of one or more interactions captured within an environment, the method comprising: receiving the interactions; receiving definition of two or more categories and criteria for an interaction to be assigned to each of the categories; based on the criteria, categorizing the interaction to the categories; and determining a network of connections between the categories. The method can further comprise the step of determining a layout for the category network. The method can further comprise the step of visualizing the category network. Within the method, the visualizing is optionally based on minimizing a graph-energy indicator associated with the category network. Within the method, the visualizing is optionally uses time-based layouts. The method can further comprise the step of clustering two or more categories into one category group. The method can further comprise the step of extracting data from the interactions. The method can further comprise the step of training a category relation network model. The method can further comprise the steps of: extracting one or more key-phrases from one or more of the categories; determining a key-phrase network; and determining a layout for the key-phrase network. Within the method, the key-phrase network is optionally unified with the category network. The method can further comprise the step of generating a key-phrase relation network model. Within the method, the data optionally comprises one or more items selected from the group consisting of: transcription data; spotted words; emotion indication; phonetic search result; Computer Telephony Integration; screen events; talkover data; and textual analysis. Within the method, a connection between two categories is determined according to a number of interactions assigned to the at least two interactions. Within the method, a connection between two categories is optionally determined according to a category relations network model. Within the method, generating the category relations network model optionally comprises the steps of: receiving descriptions of two or more categories and criteria for an interaction to be assigned to the categories; receiving one or more training interactions; based on the criteria, categorizing the training interactions to the categories; receiving category-relations tagging; based on the training interaction assigned to the categories, determining one or more category-relation features; and training a category-relation network model based on the category-relation features. Within the method, a connection between two key-phrases is optionally determined according to a key-phrase relations network model. Within the method, generating the key-phrase relations network model optionally comprises the steps of: receiving definitions of two or more categories and criteria for an interaction to be assigned to the categories; receiving one or more training interactions; based on the criteria, categorizing the training interactions to the categories; extracting one or more key-phrases from the training interactions assigned to each of the categories; receiving key-phrase-relations tagging; determining one or more key-phrase-relation features; and training a key-phrase relation network model based on the key-phrase-relation features. Within the method, categorizing the interactions to the two or more categories is optionally performed automatically.

Another aspect of the disclosure relates to an apparatus for visualization of an interaction categorization of one or more interactions captured within an environment, the apparatus comprising: an interaction receiving or capturing component for receiving or capturing the interactions; a category and criteria receiving or definition component for receiving or defining definitions for two or more categories, and one or more criteria for each category; a categorization component for categorizing the interactions to the categories based on the criteria; and a category network determination component for determining a network of category connections between the categories. The apparatus can further comprise a layout determination component for determining a layout for the network of category connections. The apparatus can further comprise a visualization component for visualizing the network of category connections. Within the apparatus, the visualization component optionally represents the network according to intensity level of category correlations. Within the apparatus, the visualization component optionally represents the network according to time domain correlations between categories. The apparatus can further comprise: a key-phrase extraction component for extracting two or more key-phrases from the interactions; and a key-phrase network determination component for determining a network of key-phrase connections between the key-phrases. The apparatus can further comprise an extraction component for extracting data from the interactions. Within the apparatus, the extraction component is optionally selected from the group consisting of: a speech-to-text engine; a word spotting engine; an emotion detection engine; a talkover engine; and additional engines. The apparatus can further comprise a clustering component for clustering two or more categories into one category. The apparatus can further comprise a category-connection training component for generating a category-connection network model. The apparatus can further comprise a key-phrase-connection training component for generating a key-phrase-connection network model.

Yet another aspect of the disclosure relates to an apparatus for visualization of an interaction categorization of one or more interactions captured within an environment, the apparatus comprising: an interaction receiving or capturing component for receiving or capturing the interactions; a category and criteria receiving or definition component for receiving or defining definitions for two or more categories, and criteria for each category; a categorization component for categorizing the interactions to the categories based on criteria; a category-connection network determination component for determining a network of category connections between the categories; a layout determination component for determining a layout for the network of category connections; a visualization component for visualizing the network of category connections; and a storage device for storing the interactions, a categorization of the interactions; a category-connection network; or a layout of the category-connection network.

Yet another aspect of the disclosure relates to a computer readable storage medium containing a set of instructions for a general purpose computer, the set of instructions comprising: receiving one or more captured interactions; receiving definition of two or more categories and criteria for an interaction to be assigned to the categories; based on the criteria, categorizing the interactions to the at least two categories; and determining a category network of connections between the categories.

BRIEF DESCRIPTION OF THE DRAWINGS

The present invention will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter provides a method and apparatus for extracting and presenting information, such as reasoning, insights, or other aspects related to an organization from interactions received or handled by the organization. The interactions are assigned to categories according to predetermined criteria associated with the categories.

In order to extract more insight from the categorized interactions, the relations within and between categories are analyzed.

For each category, the content of the category is extracted. Content extraction comprises automatically or manually compiling a list of key-phrases that represent, are extracted from, or are otherwise related to the category or to major topics of the category, the environment, an associated person, or a particular subject or entity within the organization. Each key-phrase comprises one or more words or terms. Then relations between these key-phrases can add additional understanding of the category and can contribute significantly as to understanding the cause of the issue and lead to the solution.

Then, the relations between categories, based on interactions, subjects, key-phrases or other entities which are common to two or more categories are determined and optionally visualized, so as to enable a user to exploit the available data. Realizing the relations between categories provides a user with deeper understanding of the nature of issues and problems, may reveal connections between issues which are otherwise hard to detect, and so on. The terms relation between categories, correlation between categories, and connection between categories are used interchangeably throughout the disclosure, and all indicate association between categories due to common interactions, words, subjects or other entities as detailed below.

Figure 1:
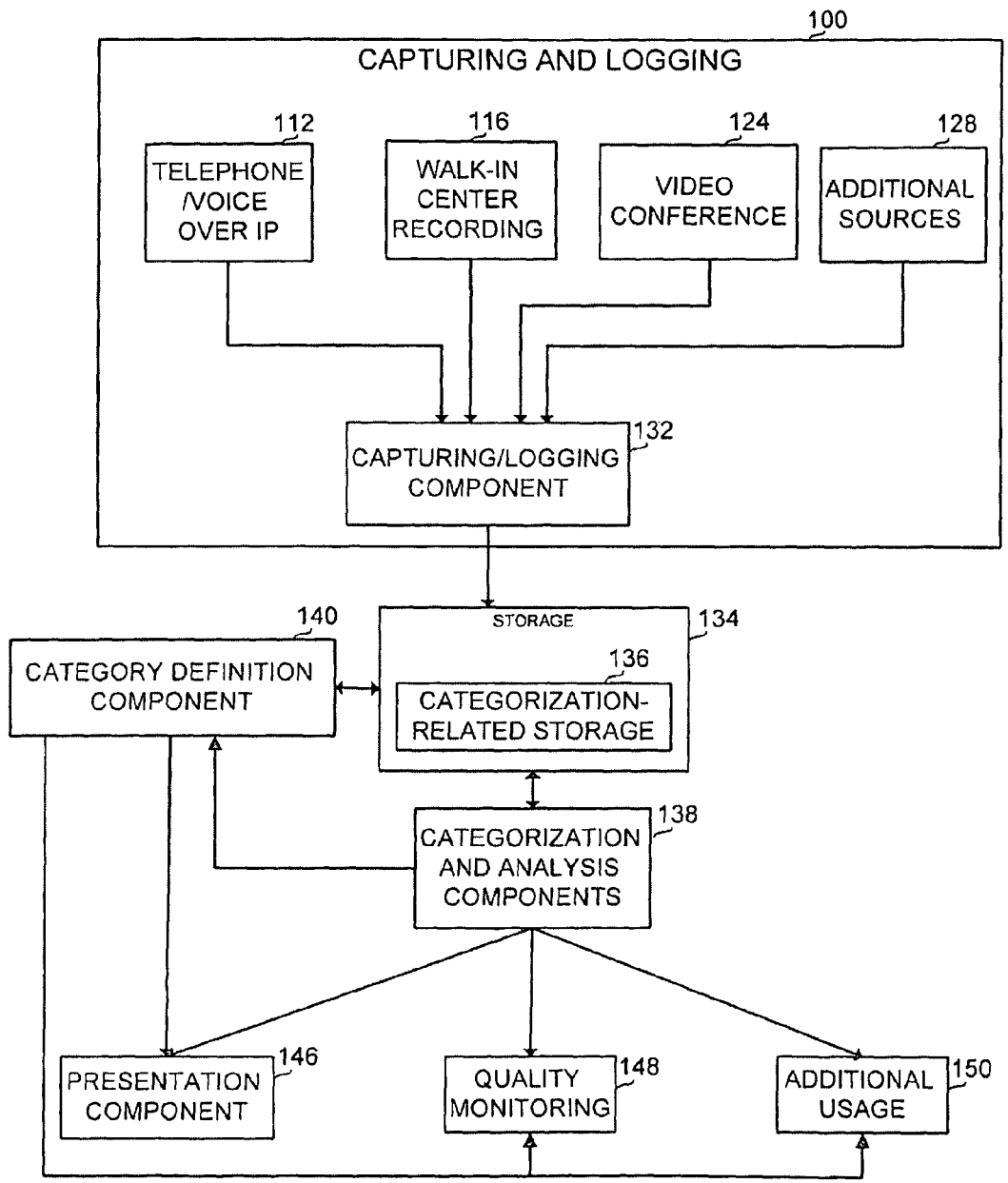
FIG. 1 is a block diagram of the main components in a typical environment in which the disclosed methods and apparatus are used.

Referring now to FIG. 1, showing a typical environment in which the disclosed apparatus and methods are used. The environment is preferably an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like. Segments, including broadcasts, interactions with customers, users, organization members, suppliers or other parties are captured, thus generating input information of various types. The information types optionally include auditory segments, video segments, textual interactions, and additional data. The capturing of voice interactions, or the vocal part of other interactions, such as video, can employ many forms and technologies, including trunk side, extension side, summed audio, separate audio, various encoding and decoding protocols such as G729, G726, G723.1, and the like. The vocal interactions usually include telephone or voice over IP sessions 112. Telephone of any kind, including landline, mobile, satellite phone or others is currently the main channel for communicating with users, colleagues, suppliers, customers and others in many organizations. The voice typically passes through a PABX (not shown), which in addition to the voice of two or more sides participating in the interaction collects additional information discussed below. A typical environment can further comprise voice over IP channels, which possibly pass through a voice over IP server (not shown). It will be appreciated that voice messages are optionally captured and processed as well, and that the handling is not limited to two- or more sided conversation. The interactions can further include face-to-face interactions, such as those recorded in a walk-in-center 116, video conferences 124, and additional sources of data 128. Additional sources 128 may include vocal sources such as microphone, intercom, vocal input by external systems, broadcasts, files, or any other source. Additional sources may also include non vocal sources such as e-mails, chat sessions, screen events sessions, facsimiles which may be processed by Object Character Recognition (OCR) systems, or others.

Data from all the above-mentioned sources and others is captured and preferably logged by capturing/logging component 132. Capturing/logging component 132 comprises a computing platform executing one or more computer applications as detailed below. The captured data is optionally stored in storage 134 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be located onsite where the segments or some of them are captured, or in a remote location. The capturing or the storage components can serve one or more sites of a multi-site organization. A part of, or storage additional to storage 134 is storage 136 which stores the categories, categorization results, and additional categorizing-related data, such as key-phrases extracted from the categories. Storage 134 can comprise a single storage device or a combination of multiple devices. Categorization and key-phrase network components 138 categorize the interactions into the various categories, analyses the categories and key-phrases and their inter-relations and. The apparatus further comprises optional category definition component 140 for defining categories, the criteria which an interaction should comply with in order to be assigned to the category, descriptors of the category, category hierarchy or structure, or other characteristics. Category definition component 140 and categorization and analysis components 138 are further detailed in association with FIG. 6 below.

The results of categorization and analysis components 138 and optionally data from category definition component 140 are preferably sent to presentation component 146 for presentation in any way the user prefers, including for example various graphic representations, textual presentation, table presentation, vocal representation, or the like, and can be transferred in any required method, including showing on a display device, sending a report, or others. The results can further be transferred to or analyzed by a quality monitoring component 148, for monitoring one or more aspects of a category, an agent, a participant in an interaction, a product, a product line, or the like. The results are optionally transferred also to additional usage components 150, if required. Such components may include playback components, report generation components, alert generation components, or others. The categorization and analysis results can be further fed back and change the categories, the category structure or criteria, or other factors.

The apparatus preferably comprises one or more computing platforms, executing components for carrying out the disclosed steps. The computing platform can be a general purpose computer such as a personal computer, a mainframe computer, or any other type of computing platform that is provisioned with a memory device (not shown), a CPU or microprocessor device, and several I/O ports (not shown). The components are preferably components comprising one or more collections of computer instructions, such as libraries, executables, modules, or the like, programmed in any programming language such as C, C++, C#, Java or others, and developed under any development environment, such as .Net, J2EE or others. Alternatively, the apparatus and methods can be implemented as firmware ported for a specific processor such as digital signal processor (DSP) or microcontrollers, or can be implemented as hardware or configurable hardware such as field programmable gate array (FPGA) or application specific integrated circuit (ASIC). The software components can be executed on one platform or on multiple platforms wherein data can be transferred from one computing platform to another via a communication channel, such as the Internet, Intranet, Local area network (LAN), wide area network (WAN), or via a device such as CDROM, disk on key, portable disk or others.

Figure 2:
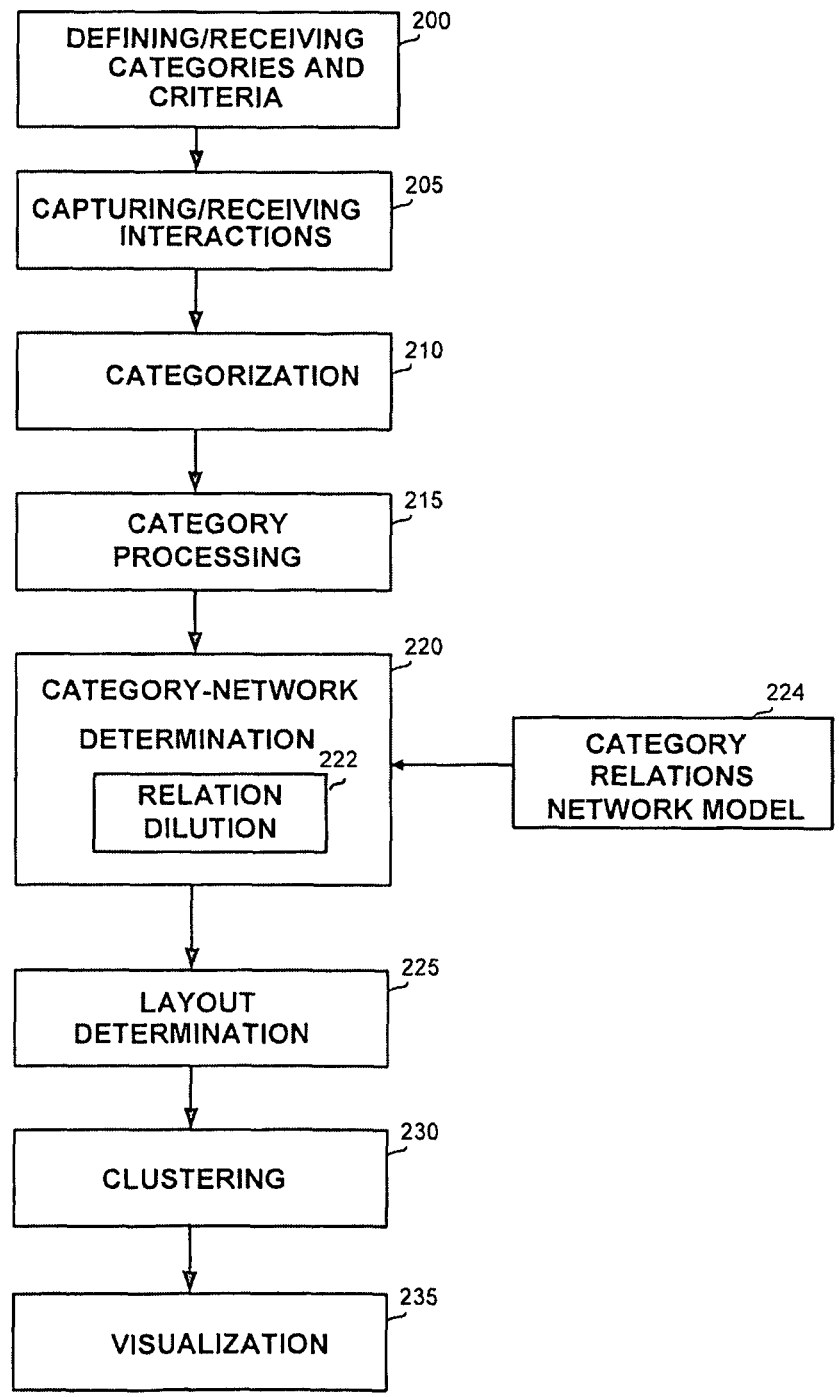
FIG. 2 is a flowchart of the main steps in an embodiment of a method for categories determination and visualization.

Referring now to FIG. 2, showing a flowchart of the main steps in an embodiment of a method for category relations determination and visualization.

The method starts on step 200 on which a user, such as an administrator, a person in charge of quality assurance, a supervisor, a person in charge of customer satisfaction, a business analyst, or any other person defines categories and criteria for assigning interactions to the categories. Alternatively, categories can be received from an external source such as but not limited to predefined packaged solution, or defined upon a statistical model or by an automatic tool. Further, the categorization of a corpus of interactions can be received, and criteria for interactions can be deduced by machine learning techniques such as neural networks or support vector machines.

The category definition is optionally received or constructed as a hierarchical structure, meaning that categories are defined as a descendent, ancestor or sibling of one another. Then, criteria to be applied to each interaction, in order to test whether or to what degree the interaction should be assigned to the category are also defined or received. The criteria can relate to raw data associated with the interaction, including data received from external systems, such as Customer-Relationship-Management (CRM), billing, Computer-Telephony-Integration (CTI) or the like. Alternatively, the criteria relates to characteristics of the interaction, including raw characteristics such as length or number of participants, as well as products of processing to be applied to the interaction, including word spotting, transcription, emotion analysis, phonetic search, textual analysis, or the like.

On step 205, interactions are captured and optionally logged within the organization, using for example capturing and logging unit 100. Alternatively, interactions can be received from any other source. Optionally, additional data, for example data external to the interaction itself such as CTI, CRM, billing or other data is also received or captured with the interactions. Optionally, the captured data undergoes some preprocessing, such as speaker separation, noise reduction, or other processing applied at audio, Parts of Speech (POS) tagging, stemming, stop words removal or other processing applied at textual interactions, or the like. The segments are optionally stored and can be later retrieved.

On step 210 the interactions are categorized or classified, i.e. their compliance with the criteria relevant to each category is assessed. The interaction is optionally classified by an automatic classifier such as neural network or an SVM.

The categorization optionally comprises initial processing or data extraction such as activating an engine or process for detecting events within an interaction, such as terms, text, spotted words, emotional parts of an interaction, or events associated with the call flow, such as number of transfers, number and length of holds, silence period, talk-over periods or others, is performed on the segments. If the categories are defined in a hierarchical structure, then classification step 210 can be designed to first test whether an interaction is associated with a parent category before testing association with a descendent category. Alternatively, the assignment to each category can be tested independently from other categories. If an interaction is determined to comply with criteria related to multiple categories, it can be assigned to one or more of the categories. For example, an interaction can be assigned to a category related to "unhappy customer", to a category related to "product X", and to a category related to "technical problems". In some embodiments, if the criteria for an interaction to be assigned to a category comprises multiple conditions, preferably the conditions whose testing consume less resources, such as CTI events, are tested first, and only if necessary, testing of higher resource consuming tests, such as word spotting are performed.

A score, an adherence factor or a compliance factor can be assigned to the interaction-category relationship, such that the interaction is assigned to all categories for which the score or adherence factor for the interaction-category relationship exceeds a predetermined threshold, to the category for which the factor is highest, or the like. Alternatively, the adherence factor can be binary, indicating whether or not the interaction should be assigned to the category. The adherence factor can be determined in the same manner for all categories, or in a different way for each category. The output of step 210, being the categories for which each interaction is categorized is transferred to category processing step 215.

In category processing step 215, the interactions in one or more categories are further processed by targeted analysis. The analysis is aimed at extracting features from the interactions. Targeted analysis may refer to analyzing only some of the categories. For example, a user such as a business with limited resources may prefer to analyze interactions assigned to an "unhappy customer" category over interactions in the "content customer" category. In another example, a company may prefer to further analyze categories related to new products over analyzing other categories. Another aspect of targeted analysis may refer to analysis types that match the interactions. For example, emotion analysis is more likely to be performed on interactions related to an "unhappy customer" category than on interactions related to "general query" category.

The analysis may include efficient and relatively fast processing such as phonetic search; emotion analysis; word spotting; call flow analysis, i.e., analyzing the silence periods; cross over periods; number and length of hold periods; number of transfers; web flow analysis, i.e. tracking the activity of one or more users in a web site and analyzing their activities, or others. The analysis may optionally use more resource-consuming analysis, such as speech-to-text; intensive audio analysis algorithms; data mining; text mining; root cause analysis being analysis aimed at revealing the reason or the cause for a problem or an event from a collection of interactions; link analysis, relating to extracting phrases that have a high co-appearance frequency within one or more phrases, paragraphs or other segments of interactions; contextual analysis which is a process that extracts sentences that include a target concept out of texts; text clustering; pattern recognition; hidden pattern recognition; prediction algorithms; OLAP cube analysis, or others. Third party engines, such as Enterprise Miner™ manufactured by SAS (www.sas.com) can be used as well for analysis. The analysis may use data from external sources, including CTI information, billing information, CRM data, demographic data related to the participants, or the like.

After category processing step 215, category network determination step 220 takes place, in which relations between two or more categories are detected. The relations are based on detecting interactions within the categories that have common, similar or related features. A relation between two categories is optionally assigned a strength or intensity value, based on the common interactions contained in the categories, and/or based on the similarity measures between the categories, such as content similarity expressed in key words, model based distance, or others. The relations are optionally generated based on a category relations network model 224 using machine learning techniques such as Support Vector Machine (SVM) or neural networks (detailed below). The model optionally utilizes data extracted on step 210, which relates to the interactions' content, the interactions' flow, or parameters associated with the environment. The generation of a category relations network model is detailed in association with FIG. 4 below. An optional sub-step of category processing step 220 is relation dilution step 222, in which some of the connections between categories are discarded in order to ensure that the visualization of the categories and connections thereof is not overcrowded and does not disable the user from grasping the significant insights. By referring to the categories and connections as a graph, whose vertices are the categories and the edges are the connections, graph algorithms can be used, for example graphs density assessment or edge threshold.

On step 225, a layout is determined for the graph consisting of the categories and relations. The layout is determined in order to enhance its clarity and effectiveness, so the more important issues can be noticed by a user. The visualization is optionally performed by minimizing the total graph energy, based for example on energy functions. Additional possible layouts can include time-based layouts and simple layouts such as a circle layout, or the like.

Another optional step is clustering step 230 which is performed on the categories, by creating one or more clusters, each cluster comprising two or more categories. Clustering is intended to unify different categories, so as to further stress the relations between neighboring categories. The term neighboring categories relates to connected categories, and not necessarily to visually adjacent categories.

On visualization step 235, a graph or another visual representation of the determined networks is presented to a user on a computerized display, printer or any other graphic manner.

Figure 3:
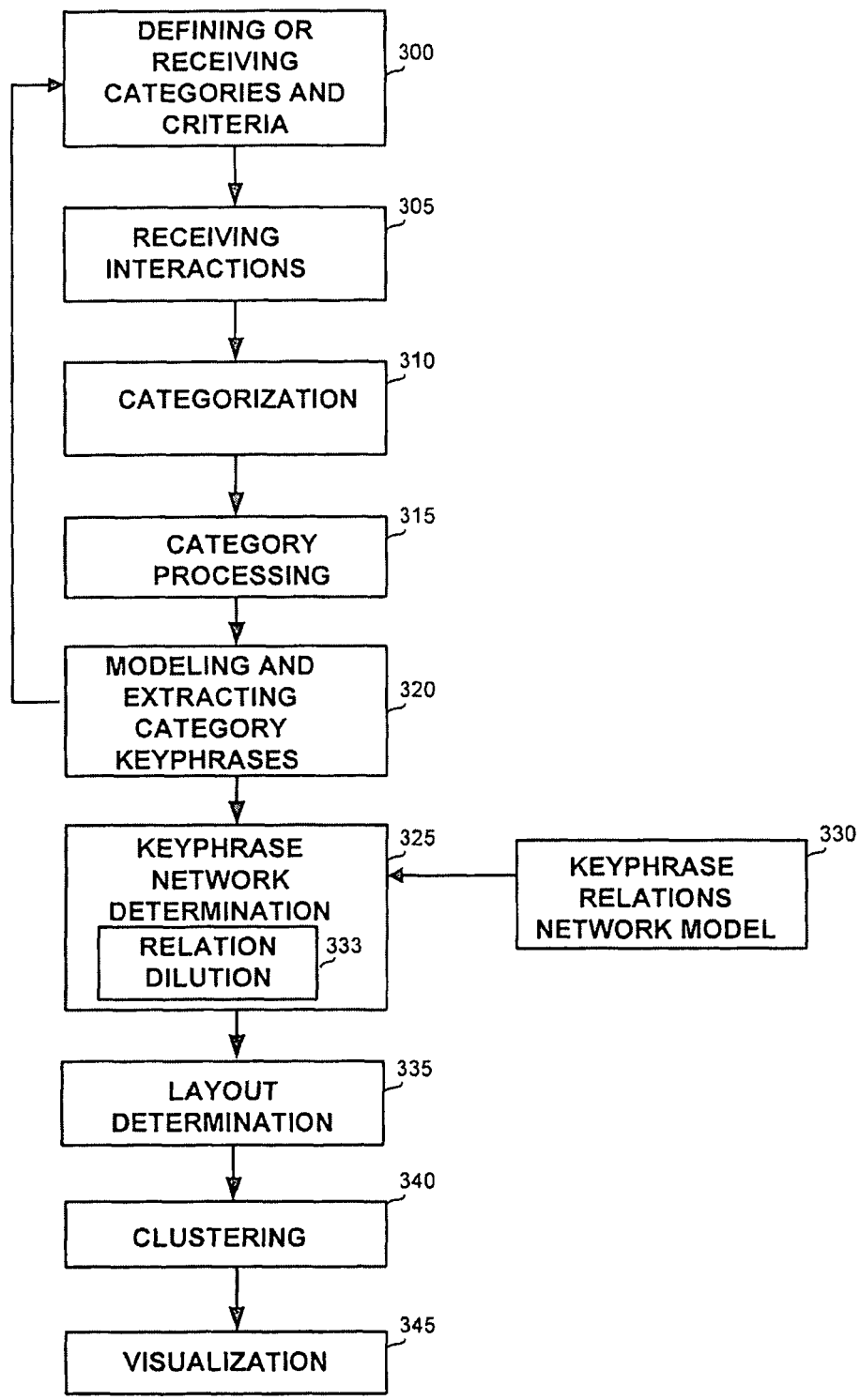
FIG. 3 is a flowchart of the main steps in an embodiment of a method for topics and key-phrases determination and visualization.

Referring to FIG. 3, showing a flowchart of the main steps in an embodiment of a method for key-phrase relations determination and visualization.

Category defining or receiving step 300, interaction receiving step 305, categorization step 310 and category processing step 315 are analogous to category defining or receiving step 200, interaction receiving step 205, categorization step 210 and category processing step 215 of FIG. 2, respectively.

The output of category processing step 315, such as the full texts of the interactions assigned to the category or parts thereof, together with their classification are processed by modeling and analysis engine on step 320, to reveal one or more aspects related to the relevant category. The products of modeling and analysis step 320 are optionally fed back to category and criteria definition step 300. When such feedback is performed, a user is presented with options to modify, add, remove, or unite key-phrases extracted on step 320 with the category or criteria defined on step 300.

On step 325 the relations between any two key-phrases are determined. The relation intensity between key-phrases is determined based on the number of interactions in which the two key-phrases are present, or on acoustic prosodic features related to the key-phrases such as the distance between the key-phrases in the interactions, the distance of each key-phrase from the beginning of the interaction, the scores that reflect the relevance of a key-phrase to the category for each key-phrase, the part of speech (POS) of words within the key-phrases and the relations between the parts of speech of different key-phrases, or the like. Optionally, the relations between key-phrases can also be generated using a key phrase relation network model 330 based on machine learning techniques such as Support Vector Machine (SVM) algorithm, neural networks or others. The relationship model and its construction are detailed in association with FIG. 5 below. Alternatively, a co-interaction based model can be used.

On optional relation dilution step 333 some of the connections between key-phrases are discarded in order to ensure that the visualization of the key-phrases and connections thereof is not overcrowded and does not disable the user from grasping the significant insights. The dilution is optionally performed by assessing graphs density, edge thresholds or similar methods.

On layout determination step 335 a visualization of key-phrase network is determined. The visualization may be determined by minimizing the total graph energy, based on one or more optional energy functions. Some possible layouts include time based layouts, a circle wherein key-phrases are represented as points along the perimeter of the circle, or any other layouts. Optional clustering step 340 and visualization step 345 are respectively analogous to clustering step 230 and visualization step 235 of FIG. 2 above.

Optionally, elements of the methods of FIG. 2 and FIG. 3 are combined, so that one or more category networks and one or more key-phrase network are generated. For example, a unified network of categories and key-phrases can be generated. Two networks of the same or of different types are optionally visualized together, thus providing the user with further understanding of the relations between the categories and the key-phrases. For example, if a connection between categories is determined by the number of common key-phrases, then pointing at the representation of the connection between the categories can open a list of the common key-phrases. Alternatively, if two key-phrases are connected because they appear in the same categories, then pointing at the representation of the connection between the key-phrases can open a list of the categories in which both key-phrases are detected.

Figure 4:
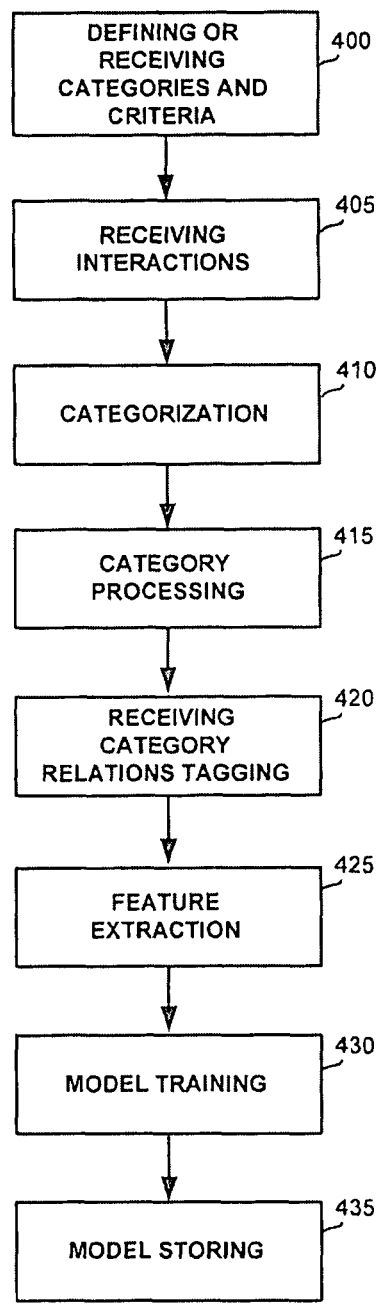
FIG. 4 is a flowchart of the main steps in an embodiment of a method for categories relation model training.

Referring now to FIG. 4, showing a flowchart of the main steps in a method for training a category relations model. The method of FIG. 4 or similar methods intended for the same result is optionally performed on one corpus and used within multiple call centers. If enhanced performance is required, or specific needs are to be met, a more specific model can be trained for a specific call center in the same manner.

Category defining or receiving step 400, interaction receiving step 405, categorization step 410 and category processing step 415 are analogous to category defining or receiving step 200, interaction receiving step 205, categorization step 210 and category processing step 215 of FIG. 2, respectively. However, the received interactions are training interactions, which should be as characteristic as possible to interactions later captured at the environment. Regarding interaction receiving step 405, when one model is to be used in multiple call centers, it is required that the model is generated from interactions captured in multiple call centers, so that the model is not biased.

On tagging step 420, tags for the relations between category pairs are received. The tagging is performed, for example, by an expert or another person familiar with the specific subject matter. The tag is set in a predetermined range, such as the range of [0-1]. However, for feasibility and performance considerations, only a predetermined number of relation levels are allowed, for example 5 levels.

On feature extraction step 425 categorization features are determined or extracted. The features are determined, so as to enable a machine to assign a tag to a relation between two categories, so that the tag is as close as possible to a tag assigned by the user. The features thus relate to characteristics of the categories. The features may relate but are not limited to any one or more of the following:

Correlation between the interactions classified to each of the categories. This feature may be defined as:

$$\frac{\text{count}(CatA \cap CatB)}{\text{count}(CatA \cup CatB)},$$

i.e. the number of interactions in both category A and category B, divided by the number of interactions in category A or category B.

Correlation between the categorization scores of interactions in the categories, which is optionally defined as:

$$\frac{\sum_{CatA \cap CatB} \frac{1}{\log_{10}(\text{ABS}(catAScore - catBScore) + 10)}}{\text{Count}(CatA \cup CatB)}$$

wherein for each interaction associated with both categories, catAScore is defined as the score of the interaction regarding Category A, reflecting how related the interaction is to Category A, and analogously for catBScore.

Any other formula based on categorization score of interactions assigned to one or more categories.

Mean key-phrase score difference between categories (limited to the top predetermined number of key-phrases in each category). A score is assigned per key-phrase to each category, which reflects the relevance of the key-phrase to the category. The square (or another measure, such as the absolute value) of a difference between the scores assigned to two categories for a particular key-phrase is determined, and the absolute values are averaged over all key-phrases common to the two categories.

Cross correlation, i.e., the correlation between categories over time. For example, testing whether an increase in the call volume in Category A correlates to an increase in the call volume in Category B. In other examples, the correlation between the number of interactions assigned to categories, on a day/week/month/etc. basis are tested. This feature is similar to the ratio between the number of interactions assigned to each category. However this feature is time based and is not limited to the use of the total number of interactions.

Common words in the definition of the categories, including the number of common words, their importance (being a "golden" word, i.e. an indicative word), how crucial a word is to the definition of the category, and similar factors, optionally considering also the length of the category definition.

Correlation between the specific agents handling issues related to the category. This feature is especially meaningful in call centers wherein each agent handles specific domains or issues.

On model training step 430, a machine learning category-relation network model is trained based upon the features extracted on step 425. The model is preferably of the form of an SVM or Neural Network. Each model can be implemented as a collection of several models, one model for each required correlation level. Optionally, models can be constructed for any predetermined number, such as five (5) correlation levels. The correlation between any two categories is then divided into the tagged levels by selecting the top scoring model for each level. Alternatively, correlations can be given a continuous score by integrating the correlation scores from all level models, and not just the model relating to a particular level. For example the following equations can be used:

$$\text{Score} = \sum_{AllModels} S_i \cdot \text{Score}(cat_k, cat_M, M_i)$$

wherein the summation is over the different models, each associated with a particular correlation level, $M_i$ is a Model of a particular level, $S_i$ is the correlation level modeled by $M_i$, and $\text{Score}(cat_M, cat_K, M_I)$ is the Model score for categories k and m, under model $M_I$, and the resulting score represents the correlation intensity between two categories.

Another optional formula is:

$$\text{Score} = S_i + \sum_{j \neq i} \pi(d(S_i, S_j)) * \text{Score}(cat_k, cat_M, M_j)$$

wherein i is determined as:

$$i = \text{ArgMax}_{j \in AllModels}(\text{Score}(cat_k, cat_M, M_j))$$

wherein $d(S_i, S_j)$ is a distance measure between the represented correlations and $\pi(x)$ is a monotonic descending function such as $1/x$.

On model storing step 435 the model is stored on a persistent storage, such as a hard disk, in any required format such as one or more files, a database, or the like. The storage device can be a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The model is optionally generated once and in a central location, rather than on-site. Optionally, more specific or more updated models may be generated on-demand, based on the model.

Figure 5:
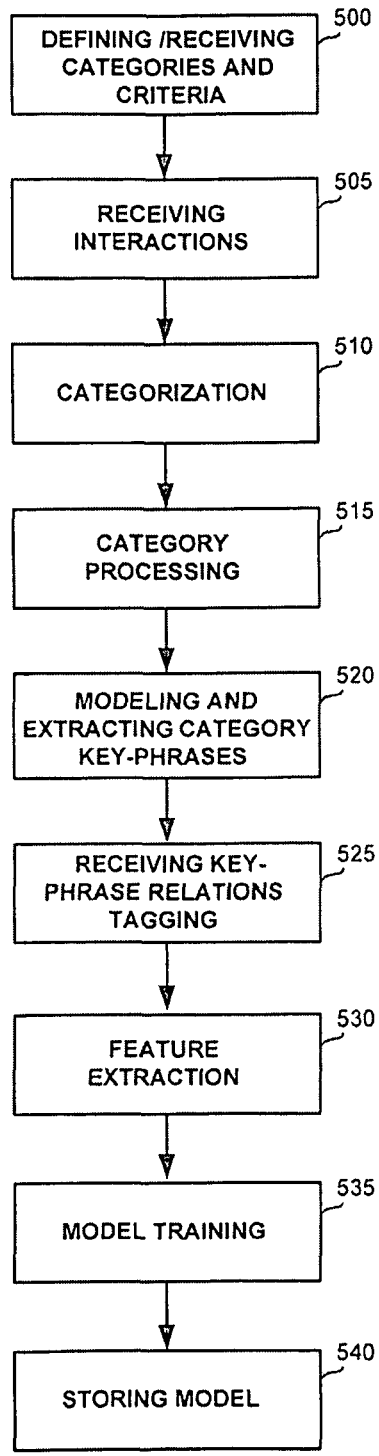
FIG. 5 is a flowchart of the main steps in an embodiment of a method for key-phrases and category topics relations model training.

Referring now to FIG. 5 showing a flowchart of the main steps in an embodiment of a method for training a key-phrase relations model.

The method of FIG. 5 or similar methods intended for the same result is optionally performed on one corpus and used within multiple call centers. If enhanced performance is required, or specific needs are to be met, a more specific model can be trained for a specific call center in the same manner.

Category defining or receiving step 500, interaction receiving step 505, categorization step 510, category processing step 515 and modeling and extracting category key-phrases step 520 are analogous to category defining or receiving step 300, interaction receiving step 305, categorization step 310, category processing step 315, and modeling and extracting category key-phrases step 320 of FIG. 3, respectively. However, the received interactions are training interactions, which should be as characteristic as possible to interactions later captured at the environment. Regarding interaction receiving step 505, when one model is to be used in multiple call centers, it is required that the model is generated from interactions captured in multiple call centers, so that the model is not biased.

On tagging step 525, tags for the relations between key-phrase pairs are received. The tagging is performed, for example by an expert or another person familiar with the specific subject matter. The tag is set in a predetermined range, such as the range of [0-1]. However, for feasibility and performance considerations, only a predetermined number of relation levels are allowed, for example 5 levels.

On feature extraction step 530 the features for the machine learning are determined. The features are determined, so as to enable a machine to assign a tag to a relation between two key-phrases, so that the tag is as close as possible to a tag assigned by the user. The features thus relates to characteristics of the key-phrases and the categories from which the key-phrases were extracted from. The features may relate but are not limited to any one or more of the following:

Correlation between the key-phrases detected in the interactions. This feature may be defined as:

$$\frac{\text{count}(KeyPhraseAInteractions \cap KeyPhraseBInteractions)}{\text{count}(KeyPhraseAInteractions \cup KeyPhraseBInteractions)},$$

i.e. the number of interactions in which both key-phrase A and key-phrase B are detected, divided by the number of interactions in which either key-phrase A or key-phrase B are detected.

The average distance, optionally counted in words, between the two key-phrases, summed over all interactions containing both key-phrases, and divided by the total number of interactions in which one or more of the key-phrases exists. This feature can be formulated as:

$$\frac{\sum_{KeyPhraseAInteractions \cap KeyPhraseBInteractions} \frac{1}{\log_{10}(dist \text{ in words} + 10)}}{\text{count}(KeyPhraseAInteractions \cup KeyPhraseBInteractions)}.$$

Any formula based on the distance within an interaction between appearances of two key-phrases.

The average location of the first appearance of a key-phrase in an interaction. This feature is optionally determined separately for each key-phrase, and the connection between two key-phrases is determined according to the absolute difference of their average location.

An average score of a key-phrase in relation to one or more categories. The connection between two key-phrases is then determined according to the absolute difference of their average score.

A position of a key-phrase within an interaction.

The distribution of the number of times a key-phrase is mentioned by the agent and by the customer.

Key-phrase scores, relating to a confidence or importance score assigned to key phrases, as detailed in U.S. patent application Ser. No. 12/128,844 filed on May 25, 2008.

Once the features are determined, on model training step 535, a machine learning key-phrase relation network model is trained based upon the features extracted on step 530. The model is preferably of the form of an SVM or Neural Network, and optionally consists of a predetermined number of models, such as five, one model for each correlation level. The correlation between any two categories is then divided into the tagged levels by selecting the top scoring model. Alternatively correlations can be assigned a continuous score by integrating the scores related to all models. For example, the following equation can be used:

$$\text{Score} = \sum_{AllModels} S_i \cdot \text{Score}(\text{key} - \text{Phrase}_k, \text{key} - \text{Phrase}_M, M_i)$$

wherein the summation is over the different models, each associated with a particular correlation level, $M_i$ is a Model, $S_I$ is the correlation level Modeled by $M_i$ and Score (Key-Phrase$_M$, Key-Phrase$_K$, $M_I$) is the model score between two Key-Phrases under model $M_I$, and the resulting score represents the correlation intensity between two Key-Phrases.

Another optional formula is:

$$\text{Score} = S_i + \sum_{j \neq i} \pi(d(S_i, S_j)) * \text{Score}(\text{key} - \text{Phrase}_k, \text{key} - \text{Phrase}_M, M_j)$$

$$i = \text{ArgMax}_{j \in AllModels}(\text{Score}(\text{key} - \text{Phrase}_k, \text{key} - \text{Phrase}_M, M_j))$$

wherein $d(S_i, S_j)$ is a distance measure between the represented correlations and $\pi(x)$ is a monotonic descending function such as $1/(x+1)$.

On model storing step 540 the model is stored on a persistent storage, such as a hard disk, in any required format such as one or more files, a database, or the like.

Figure 6:
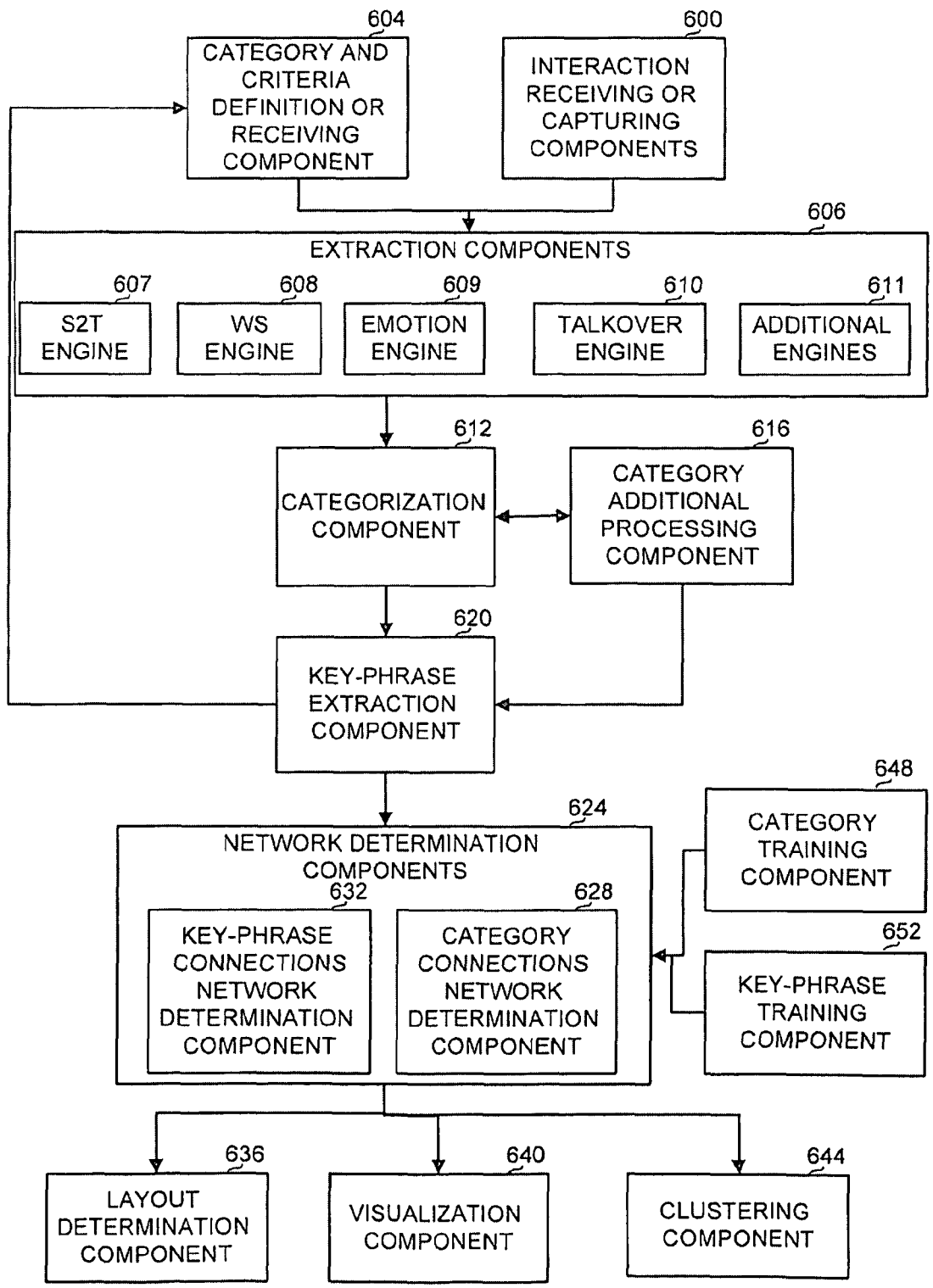
FIG. 6 is a block diagram of the main components in an apparatus for category, category topics, or category key-phrases definition, determination and visualization.

Referring now to FIG. 6, showing a block diagram of the main components in an apparatus for visualization of interaction or key-phrase categorization. The apparatus, generally shown as components 138 of FIG. 1 is preferably implemented as one or more sets of computer instructions performed by computing platforms, interacting to carry out the methods of FIGS. 2, 3, 4 and 5. The apparatus generally comprises interaction receiving or capturing components 600, category and criteria definition or receiving components 604, extraction components 606, categorization component 612, category additional processing component 616, key-phrase extraction component 620, network determination components 624, layout determination components 636, visualization component 640 and optional clustering component 644.

Interaction receiving components 600 is responsible for receiving the interactions captured from the various sources, as detailed in association with FIG. 1 above. Category and criteria definition or receiving components 604 enables a user to define or receive or categories into which the interactions are to be categorized or classified, and the criteria to be applied on an interaction when testing whether the interaction is to be applied to the particular category.

Extraction components 606 are responsible for extracting data from or related to the interactions. Extraction components 606 may include any one or more of the following components: speech to text engine 607 for transcribing audio interactions; word spotting engine 608 for detecting particular words spoken in an audio interaction; emotion engine 609 for detecting segments within an audio interaction in which one or more speakers present emotions, and the emotion degree; talkover data engine 610 for analyzing the flow of an interaction, for example segments with mutual silence, talkover segments, or the like; and additional data engine 611, for receiving any other type of data relevant for categorizing an interaction, such as an engine for receiving Computer Telephony Integration (CTI) events, screen events from a screen of a computer used by the engine, or the like.

Categorization component 612 is responsible for applying the criteria over the interactions, and assign each interaction into one or more categories. Categorization component 612 optionally provides also a score, indicating the degree to which an interaction matches a category.

Category additional processing component 616 is responsible for performing additional processing on the categories and the interactions assigned to the categories, such as targeted analysis, as detailed in association with step 215 of FIG. 2.

Key-phrase extraction component 620 is responsible for extracting key-phrases from each category. The key-phrases are optionally fed back to category and criteria receiving component 604.

Network determination components 624 is responsible for determining the inter-relations and network structure between categories and between key-phrases. Network determination components 624 comprise a category-connection network determination component 628 for determining the connections between pairs or other groups of categories, based for example on interactions common to two or more categories, and key-phrase connection network determination component 632, for determining connections between keywords, based for example on keywords appearing in the same categories or other relations.

The apparatus further comprises layout determination component 636 for determining a layout for the one or more networks determined by components 624, such as a circle, a table, or any other layout, and visualization component 640 for rendering the one or more networks according to the determined layout, and optionally providing a user with user interface for visually editing and enhancing the network, for example by clustering two or more categories or key-phrases, changing the layout, or other operations.

The apparatus optionally comprises automatic clustering component 644 for clustering two or more categories or two or more key-phrases, thus reducing the number of connections and making the network clearer and graspable by a user.

The apparatus further comprises category model training component 648 for a training phase intended for creating a model for category network determination, and key-phrase model training component 652 for a training phase intended for creating a model for key-phrase network determination. The models are then used by network determination components 624, wherein the category model is generally used by category network determination component 628 and the key-phrase model is generally used by key-phrase network determination component 632.

Figure 7A:
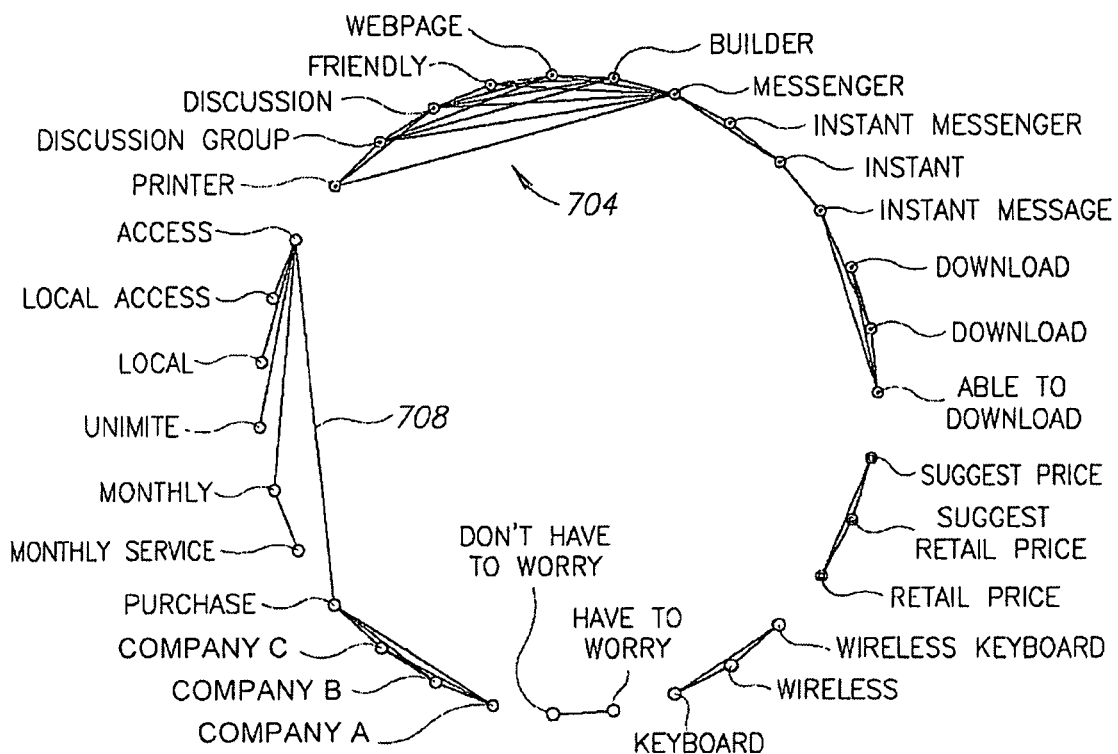
FIGS. 7A and 7B are exemplary illustrations of graphical representations of categories and correlations thereof.
Figure 7B:
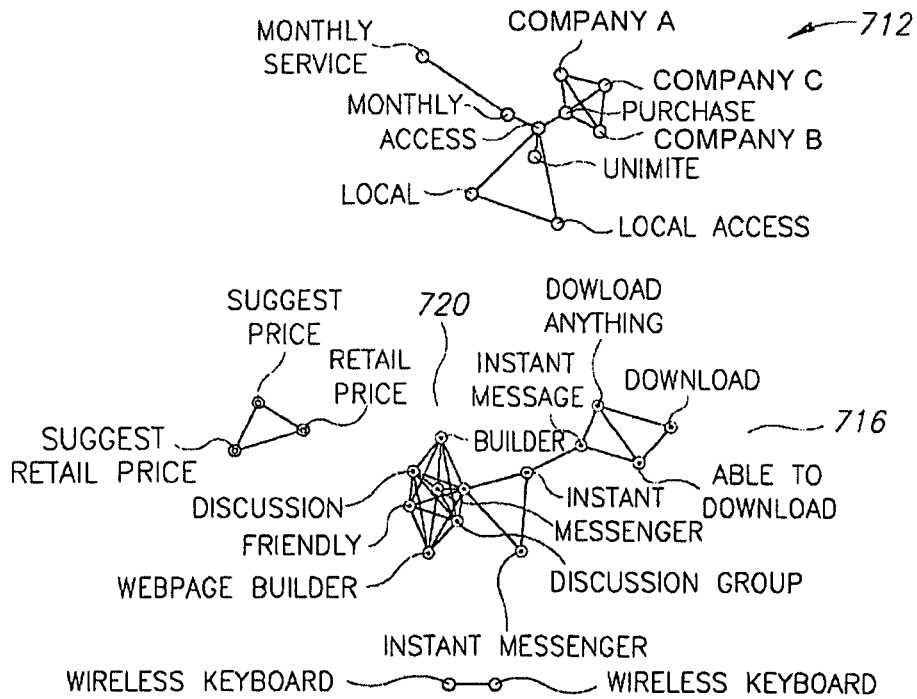

Referring now to FIGS. 7A and 7B, illustrating exemplary embodiments of visualizations of categories and correlations thereof. FIG. 7A shows a circle representation, wherein the categories are arranged along the perimeter of a circle, and connections or correlations between categories are illustrated as edges connecting two categories, such as edge 704 connecting categories "messenger" and "printer", or edge 708 connecting categories "access" and "purchase". FIG. 7B shows a visualization of general graph, wherein categories which are more tightly-correlated, such as category groups 712 and 716, are illustrated closer to each other than to other categories. In any of the representations, the correlation level between two categories can be indicated by a color, width, or pattern of the edge connecting the categories.

The disclosed methods and apparatus provide for detecting relations between categories to which interactions of call centers or other interaction-rich organizations are categorized. Key-phrases are determined that relate to or characterize each category, and relations between the key-phrases are optionally determined as well. The relations between the categories and key-words are described as a network, which can be visualized in one or more words. The user is then able to easily grasp relations between categories, relations between key-phrases, and relations between categories and key-phrases, and thus obtain understanding about relation between topics and subjects relevant to the captured interactions.

A person skilled in the art will appreciate that there exist multiple embodiments and variations exist which follow the guidelines of the disclosed methods and apparatus. Multiple implementations may exist for determining connections between categories or key-phrases, based on multiple factors, and expressed as a multiplicity of formulae. There may also exist numerous representation options which demonstrate the connections and the connections' intensity.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A computerized method for visualization of an interaction categorization, of an at least one interaction captured within an environment, the method comprising:
   capturing the at least one interaction by a computing platform executing one or more computer applications;
   receiving definition of at least two categories related to key-phrases and criteria for an interaction to be assigned to the at least two categories;
   based on the criteria, categorizing the at least one interaction to the at least two categories;
   determining by machine learning a category network of connections between the at least two categories;
      extracting an at least one key-phrase from at least one of the at least two categories;
      determining a key-phrase network;
      determining a layout for the key-phrase network; and
      visualizing the category network by the key-phrases.

2. The method of claim 1 further comprising the step of determining a layout for the category network.

3. The method of claim 1 further comprising the step of visualizing the category network.

4. The method of claim 3 wherein the visualizing is based on minimizing a graph-energy indicator associated with the category network.

5. The method of claim 3 wherein the visualizing uses a time-based layout.

6. The method of claim 1 further comprising the step of clustering at least two categories into one category group.

7. The method of claim 1 further comprising the step of extracting data from the at least one interaction.

8. The method of claim 1 further comprising the step of generating a category relation network model.

9. The method of claim 1 wherein the key-phrase network is unified with the category network.

10. The method of claim 1 further comprising step of generating a key-phrase relation network model.

11. The method of claim 7 wherein the data comprises an at least one item selected from the group consisting of: transcription data; spotted words; emotion indication; phonetic search result; textual analysis; Computer Telephony Integration; screen events; talkover data; and textual analysis.

12. The method of claim 1 wherein a connection between two categories is determined according to a number of interactions assigned to the at least two interactions.

13. The method of claim 1 wherein a connection between two categories is determined according to a category relations network model.

14. The method of claim 13 wherein generating the category relations network model comprises the steps of:
   receiving descriptions of at least two categories and criteria for an interaction to be assigned to the at least two categories;
   receiving at least one training interaction;
   based on the criteria, categorizing the at least one training interaction to the at least two categories;
   receiving category-relations tagging;
   based on the at least one training interaction assigned to the at least two categories, determining an at least one category-relation feature; and
   training a category-relation network model based on the at least one category-relation feature.

15. The method of claim 1 wherein a connection between two key-phrases is determined according to a key-phrase relations network model.

16. The method of claim 15 wherein generating the key-phrase relations network model comprises the steps of:
   receiving definitions of at least two categories and criteria for an interaction to be assigned to the at least two categories;
   receiving at least one training interaction;
   based on the criteria, categorizing the at least one training interaction to the at least two categories;
   extracting an at least one key-phrase from the at least one training interaction assigned to each of the at least one categories;
   receiving key-phrase-relations tagging;
   determining an at least one key-phrase-relation feature; and
   training a key-phrase relation network model based on the at least one key-phrase-relation feature.

17. The method of claim 1 wherein categorizing the at least one interaction to the at least two categories is performed automatically.

18. An apparatus for visualization of an interaction categorization of an at least one interaction captured within an environment, the apparatus comprising:
   an interaction receiving or capturing component for receiving or capturing the at least one interaction;
   a category and criteria receiving or definition component for receiving or defining definitions for at least two categories related to key-phrases, and at least one criteria for each category;
   a categorization component for categorizing the at least one interaction to the at least two categories based on the at least one criteria;
   a category network determination component for determining a network of category connections between the at least two categories;

a key-phrase extraction component for extracting at least two key-phrases from the at least one interaction;

a key-phrase network determination component for determining a network of key-phrase connections between the at least two key-phrases; and a display component for visualization the network of category connections by the key-phrases.

19. The apparatus of claim 18 further comprising a layout determination component for determining a layout for the network of category connections.

20. The apparatus of claim 18 further comprising a visualization component for visualizing the network of category connections.

21. The apparatus of claim 20 wherein the visualization component represents the network according to intensity level of category correlations.

22. The apparatus of claim 20 wherein the visualization component represents the network according to time domain correlations between categories.

23. The apparatus of claim 18 further comprising an extraction component for extracting data from the at least one interaction.

24. The apparatus of claim 23 wherein the extraction component is selected from the group consisting of: a speech-to-text engine; a word spotting engine; an emotion detection engine; a talkover engine; and an additional engine.

25. The apparatus of claim 18 further comprising a clustering component for clustering at least two categories into one category group.

26. The apparatus of claim 18 further comprising a category-connection training component for generating a category-connection network model.

27. The apparatus of claim 18 further comprising a key-phrase-connection training component for generating a key-phrase-connection network model.

28. An apparatus for visualization of an interaction categorization of an at least one interaction captured within an environment, the apparatus comprising:

an interaction receiving or capturing component for receiving or capturing the at least one interaction;

a category and criteria receiving or definition component for receiving or defining definitions for at least two categories related to key-phrases, and at least one criteria for each category;

a categorization component for categorizing the at least one interaction to the at least two categories based on the at least one criteria;

a category-connection network determination component for determining a network of category connections between the at least two categories;

a layout determination component for determining a layout for the network of category connections;

a key-phrase extraction component for extracting at least two key-phrases from the at least one interaction;

a key-phrase network determination component for determining a network of key-phrase connections between the at least two key-phrases; and a visualization component for visualizing the network of category connections by the key-phrases; and a storage device for storing the at least one interaction, a categorization of the at least one interaction; a category-connection network; or a layout of the category-connection network.

29. A non-transitory computer readable storage medium storing a set of instructions to instruct a processor to perform operations that comprise:

receiving an at least one captured interaction;

receiving definition of at least two categories related to key-phrases and criteria for an interaction to be assigned to the at least two categories;

based on the criteria, categorizing the at least one interaction to the at least two categories;

determining a category network of connections between the at least two categories; and extracting an at least one key-phrase from at least one of the at least two categories;

determining a key-phrase network; and visualizing the category network by the key-phrases.

30. A computerized method for visualization of an interaction categorization, of an at least one interaction captured within an environment, the method comprising:

capturing the at least one interaction by a computing platform executing one or more computer applications;

receiving definition of at least two categories related to key-phrases and criteria for an interaction to be assigned to the at least two categories;

based on the criteria, categorizing the at least one interaction to the at least two categories;

determining a category network of connections between the at least two categories;

extracting an at least one key-phrase from at least one of the at least two categories;

determining a key-phrase network; and visualizing the key-phrase network by the at least two categories in which the at least one key-phrase appear.

* * * * *